United States Patent
Haraguchi

(10) Patent No.: US 10,191,472 B2
(45) Date of Patent: Jan. 29, 2019

(54) NUMERICAL CONTROLLER PROVIDED WITH PROGRAM PRE-READING FUNCTION

(71) Applicant: FANUC Corporation, Minanitsuru-gun, Yamanashi (JP)

(72) Inventor: Takahiro Haraguchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 633 days.

(21) Appl. No.: 14/509,092

(22) Filed: Oct. 8, 2014

(65) Prior Publication Data
US 2015/0112459 A1    Apr. 23, 2015

(30) Foreign Application Priority Data
Oct. 18, 2013    (JP) .................................. 2013-217760

(51) Int. Cl.
G05B 19/408 (2006.01)

(52) U.S. Cl.
CPC .. G05B 19/408 (2013.01); *G05B 2219/35386* (2013.01); *G05B 2219/36078* (2013.01)

(58) Field of Classification Search
CPC ........ G05B 19/408; G05B 2219/35386; G05B 2219/36078
USPC ............................................ 700/47, 86, 159
See application file for complete search history.

(56) References Cited

U.S. PATENT DOCUMENTS

| | | | |
|---|---|---|---|
| 4,692,856 A | 9/1987 | Komiya | |
| 4,757,457 A * | 7/1988 | Matsumoto | G05B 19/41 318/571 |
| 5,043,644 A * | 8/1991 | Sasaki | G05B 19/4068 318/568.1 |
| 2002/0138171 A1* | 9/2002 | Fukutani | B23Q 15/12 700/188 |

(Continued)

FOREIGN PATENT DOCUMENTS

| | | |
|---|---|---|
| CN | 101201612 A | 6/2008 |
| CN | 103257857 A | 8/2013 |

(Continued)

OTHER PUBLICATIONS

Slideplayer.com, two types: numerical controls (NC), Feb. 14, 2011, p. 1-5, (NPL evidence) <URL: https://slideplayer.com/slide/3944734/> (Year: 2011).*

(Continued)

*Primary Examiner* — Robert E Fennema
*Assistant Examiner* — Marzia T Monty
(74) *Attorney, Agent, or Firm* — Drinker Biddle & Reath LLP

(57) ABSTRACT

A numerical controller successively pre-reads blocks of a plurality of NC programs from a memory or from a storage device connected via a network, while executing the NC programs in parallel. The execution times of the pre-read blocks are integrated in respect of all of the NC programs that are the object of pre-reading, and when an NC program having the shortest integrated execution time of the pre-read blocks can be pre-read, the next block in that NC program is pre-read. On the other hand, when that NC program cannot be pre-read, the NC program is excluded from the pre-reading objects.

15 Claims, 12 Drawing Sheets

(56) References Cited

U.S. PATENT DOCUMENTS

| | | | |
|---|---|---|---|
| 2003/0110481 A1* | 6/2003 | Wada | G06F 8/4441 |
| | | | 717/158 |
| 2003/0163208 A1 | 8/2003 | Sugiyama et al. | |
| 2008/0250359 A1* | 10/2008 | Sagara | G05B 19/4093 |
| | | | 715/856 |
| 2008/0269915 A1* | 10/2008 | Endo | G05B 19/416 |
| | | | 700/13 |
| 2012/0109359 A1* | 5/2012 | Mizuno | G05B 19/41865 |
| | | | 700/173 |
| 2012/0283879 A1 | 11/2012 | Takeuchi et al. | |
| 2013/0179663 A1* | 7/2013 | Heisch | G06F 9/3802 |
| | | | 712/207 |
| 2013/0205052 A1 | 8/2013 | Eyraud et al. | |
| 2014/0200706 A1 | 7/2014 | Pruschek et al. | |

FOREIGN PATENT DOCUMENTS

| | | |
|---|---|---|
| DE | 60320164 T2 | 5/2009 |
| DE | 102011105141 A1 | 12/2012 |
| JP | S59-177604 A | 10/1984 |
| JP | S63-19007 A | 1/1988 |
| JP | H02-159605 A | 6/1990 |
| JP | H03-167603 A | 7/1991 |
| JP | H08-7613 B2 | 1/1996 |
| JP | 9-282019 A | 10/1997 |
| JP | 2000-242319 A | 9/2000 |
| JP | 2007-094936 A | 4/2007 |
| JP | 2007-164509 A | 6/2007 |
| JP | 2008-040542 A | 2/2008 |
| JP | 2012-093975 A | 5/2012 |
| JP | 2012-234445 A | 11/2012 |

OTHER PUBLICATIONS

Decision to Grant a Patent dated Feb. 17, 2015 in corresponding Japanese Patent Application No. 2013-217760 with English translation.

Office Action dated Apr. 19, 2017 in German Patent Application No. 10 2014 015 007.0 (5 pages) with an English translation (5 pages).

* cited by examiner

FIG.5

EXECUTION EXAMPLES OF PATH TABLES OF X AXIS, SPINDLE S, AND AUXILIARY FUNCTION

X AXIS PATH TABLE

| REFERENCE TIME COMMAND | X AXIS POSITION COMMAND |
|---|---|
| L0.0 | X0.0 |
| L1.0 | X1.0 |
| L2.0 | X3.0 |
| L3.0 | X5.0 |
| L4.0 | X6.0 |
| L7.0 | X6.0 |
| L8.0 | X7.0 |

SPINDLE S PATH TABLE

| REFERENCE TIME COMMAND | SPINDLE SPEED COMMAND |
|---|---|
| L0.0 | S0 |
| L4.0 | S10 |
| L8.0 | S20 |

AUXILIARY FUNCTION PATH TABLE

| REFERENCE TIME COMMAND | |
|---|---|
| L2.0 | M1234 |
| L8.0 | M2345 |

| REFERENCE TIME (ms) | PROGRAM PATH OF X AXIS (mm) | SPEED OF SPINDLE S (rev/min) | OUTPUT AUXILIARY FUNCTION |
|---|---|---|---|
| 0.0 | 0.0 | 0 | |
| 1.0 | 1.0 | 0 | |
| 2.0 | 3.0 | 0 | M1234 |
| 3.0 | 5.0 | 0 | |
| 4.0 | 6.0 | 10 | |
| 5.0 | 6.0 | 10 | |
| 6.0 | 6.0 | 10 | |
| 7.0 | 6.0 | 10 | |
| 8.0 | 7.0 | 20 | M2345 |

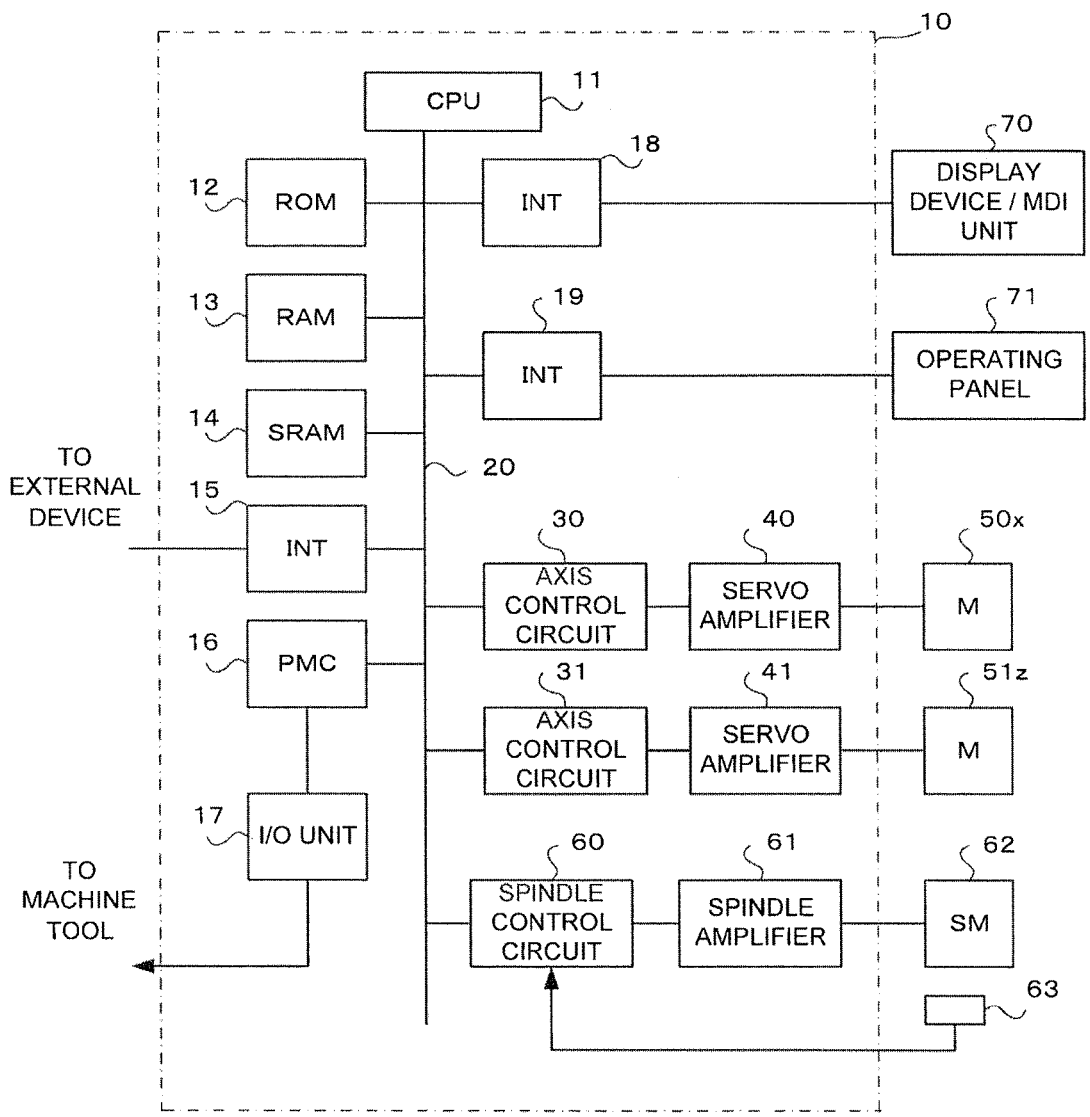

X AXIS PATH TABLE <X>

| REFERENCE TIME COMMAND | X AXIS POSITION COMMAND |
|---|---|
| L1.0 | X0.000 |
| L2.0 | X0.015 |
| L3.0 | X0.030 |
| L300.0 | X4.500 |
| .. | .. |

SPINDLE S PATH TABLE <S>

| REFERENCE TIME COMMAND | SPINDLE SPEED COMMAND |
|---|---|
| L100.0 | S100 |
| L150.0 | S200 |
| L200.0 | S400 |
| L300.0 | S600 |
| .. | .. |

AUXILIARY FUNCTION PATH TABLE <M>

| REFERENCE TIME COMMAND | AUXILIARY FUNCTION COMMAND |
|---|---|
| L1000.0 | M1111 |
| L1050.0 | M2222 |
| L1100.0 | M3333 |
| L1200.0 | M4444 |
| .. | .. |

NUMERICAL CONTROLLER PROVIDED WITH PROGRAM PRE-READING FUNCTION

RELATED APPLICATION DATA

This application claims priority under 35 U.S.C. § 119 and/or § 365 to Japanese Application No. 2013-217760 filed Oct. 18, 2013, the entire contents is incorporated herein by reference.

BACKGROUND OF THE INVENTION

1. Field of the Invention

The present invention relates to a numerical controller provided with a program pre-reading function.

2. Description of the Related Art

In NC program pre-reading control, a numerical controller is commonly known which has a function for pre-reading a predetermined number of pre-read blocks (see Japanese Patent Application Laid-Open No. 2007-94936, Japanese Patent Application Laid-Open No. 2007-164509, and Japanese Patent Application Laid-Open No. 2008-40542).

Furthermore, apart from the NC program operation described above, a numerical controller is commonly known which has a function (path table operation function) whereby data in a table format (path table) specifying axis positions with reference to time, axis position or spindle position, is stored in a memory or a storage device connected via a network, and respective axes are driven by successively reading out the table format data (path table) (see Japanese Patent Application Laid-Open No. 59-177604 or Japanese Patent Application Laid-Open No. 2012-234445). By the path table operation function, it becomes possible to achieve free tool operation independently of the machining program, and therefore the machining time can be shortened and the machining accuracy can be raised.

Furthermore, Japanese Patent Application Laid-Open No. 2012-93975 discloses a method and a device for predicting a machining time in a numerically-controlled machine tool which can improve the prediction accuracy of the machining time and shorten the calculation time for predicting the machining time.

With the NC program pre-reading control described above, in the case of an NC program which involves continuous small blocks, the pre-reading may not performed in time. If the pre-reading of any one NC program of a plurality of NC programs which are operating in coordinated fashion is not performed in time, then this affects the other NC programs as well, and the overall cycle time is lengthened.

Here, an example is described with reference to FIGS. 12 and 13 in which the overall cycle time becomes longer.

FIG. 12 is a diagram showing examples of three programs which are executed mutually in parallel by pre-reading in NC program operation. FIG. 13 is a diagram showing the integrated value of the execution times (the integrated execution time) of the pre-read blocks in each of the three programs shown in FIG. 12, at a stage where nine blocks have been pre-read, according to a conventional pre-reading control system.

An example is now described in which the three programs (O0001, O0002, O0003) shown in FIG. 12 are executed in parallel. "O0001", "O0002" and "O0003" are the respective program names. The numerical value in parenthesis in each of the programs in FIG. 12 represents the execution time of each block.

Conventionally, pre-reading of the respective programs is carried out without taking account of the integrated value of the execution times of the pre-read blocks, and therefore when pre-reading is carried out on an average basis, the pre-reading has been performed in following sequence.

(1) N11 is pre-read
 [Number of pre-read blocks (O0001, O0002, O0003)=(1, 0, 0)]
(2) N21 is pre-read
 [Number of pre-read blocks (O0001, O0002, O0003)=(1, 1, 0)]
(3) N31 is pre-read
 [Number of pre-read blocks (O0001, O0002, O0003)=(1, 1, 1)]
(4) N12 is pre-read
 [Number of pre-read blocks (O0001, O0002, O0003)=(2, 1, 1)]
(5) N22 is pre-read
 [Number of pre-read blocks (O0001, O0002, O0003)=(2, 2, 1)]
(6) N32 is pre-read
 [Number of pre-read blocks (O0001, O0002, O0003)=(2, 2, 2)]
(7) N13 is pre-read
 [Number of pre-read blocks (O0001, O0002, O0003)=(3, 2, 2)]
(8) N23 is pre-read
 [Number of pre-read blocks (O0001, O0002, O0003)=(3, 3, 2)]
(9) N33 is pre-read
 [Number of pre-read blocks (O0001, O0002, O0003)=(3, 3, 3)]

The integrated value of the execution times of the pre-read blocks in each program at the stage where nine blocks have been pre-read in the combination indicated in (9) above is as shown in FIG. 13. In this case, for program O0003, the integrated value of the execution times of the pre-read blocks is 3 ms, and therefore if operation is carried out in this state and the pre-reading is not performed in time, a wait occurs until the pre-reading is completed.

Furthermore, in the case of operation based on data in a table format (path table operation), if there is a continuation of small blocks, then there may be situations where the pre-reading of the blocks in each table format data is not performed in time. If pre-reading is not performed in time, then the device cannot be moved to the axis position in accordance with the reference time, the reference axis position or spindle position, and therefore an alarm or immediate axes stop is caused. When operating with table format data which has been modified in such a manner that pre-reading is performed in time, so as to avoid an alarm or immediate axes stop, the cycle time becomes longer.

Here, an example of a conventional technique for operation based on table format data (path table operation) while carrying out pre-reading of path tables is described, in which the three path tables shown in FIG. 14 (a path table <X> for the X axis, a path table <S> for the spindle S, and a path table <M> for an auxiliary function) are executed.

Conventionally, pre-reading is carried out without taking account of the integrated value of the execution times of the pre-read blocks, and therefore when pre-reading is carried out on an average basis, the pre-reading has been performed in following sequence.

(1) Pre-read L1 in <X>
 [Number of pre-read blocks (<X>, <S>, <M>)=(1, 0, 0)]
(2) Pre-read L100 in <S>
 [Number of pre-read blocks (<X>, <S>, <M>)=(1, 1, 0)]

(3) Pre-read L1000 in <M>
  [Number of pre-read blocks (<X>, <S>, <M>)=(1, 1, 1)]
(4) Pre-read L2 in <X>
  [Number of pre-read blocks (<X>, <S>, <M>)=(2, 1, 1)]
(5) Pre-read L150 in <S>
  [Number of pre-read blocks (<X>, <S>, <M>)=(2, 2, 1)]
(6) Pre-read L1050 in <M>
  [Number of pre-read blocks (<X>, <S>, <M>)=(2, 2, 2)]
(7) Pre-read L3 in <X>
  [Number of pre-read blocks (<X>, <S>, <M>)=(3, 2, 2)]
(8) Pre-read L200 in <S>
  [Number of pre-read blocks (<X>, <S>, <M>)=(3, 3, 2)]
(9) Pre-read L1100 in <M>
  [Number of pre-read blocks (<X>, <S>, <M>)=(3, 3, 3)]:

The integrated value of the execution times of the pre-read blocks of each path table at the stage where nine blocks has been pre-read in the combination indicated in (9) above are as shown in FIG. 15. In this case, the integrated value of the execution times of the pre-read blocks in <X> is 3 ms. The pre-reading is not performed in time if operation is carried out in this state, and therefore an alarm or an immediate axes stop is caused. In the case of path table operation, the integrated value of the execution times of the pre-read blocks of each path table is not monitored. Therefore, it has not been possible to determine, in advance, that the integrated value of the execution times of the pre-read blocks is less than the time for safe deceleration and halting.

Consequently, if the pre-reading is not performed in time, then not only is an alarm or immediate axes stop caused, but as a result of this, there is possibility of causing shocks to the machine. In particular, when operating by carrying out pre-reading from a storage device which is connected to a network, there is a possibility of communications being cut off due to a temporary network problem, and therefore the resolution of this problem has become an issue.

SUMMARY OF THE INVENTION

In order to resolve the problems of the prior art described above, it is an object of the present invention to provide a numerical controller provided with a program pre-reading function for preventing the pre-reading from failing to be performed in time, and preventing lengthening of the cycle time, when a plurality of NC programs are executed in parallel, and to provide a numerical controller provided with an operating function based on table format data, wherein, when a plurality of table format data are executed in parallel during operation of the table format data (path table operation), the generation of an alarm or an immediate axes stop due to the fact that pre-reading is not performed in time, becomes less liable to occur.

In order that the pre-reading is performed in time when the plurality of NC programs are executed in parallel, NC programs having the shortest execution time of the pre-read blocks are pre-read as a priority. Consequently, the pre-reading is prevented from failing to be performed in time, and lengthening of the cycle time is prevented. A numerical controller having a function for calculating the execution times of the blocks of the NC program is well-known (see Japanese Patent Application Laid-Open No. 2012-93975).

Furthermore, apart from the NC program operation described above, if a plurality of table format data are executed in parallel during operation based on table format data, it is determined where to carry out pre-reading among the plurality of table format data, on the basis of a priority. By prioritizing the pre-reading of data having a short execution time of the pre-read blocks, the generation of an alarm or an immediate axes stop due to the pre-reading failing to be performed in time becomes less liable to occur. As a result of this, it becomes unnecessary to modify table format data as in the prior art, and shortening of the cycle time can be expected compared to the prior art.

A first aspect of the numerical controller according to the present invention is a numerical controller which successively pre-reads blocks of a plurality of NC programs from a memory or from a storage device connected via a network, while executing the NC programs in parallel, the numerical controller comprising: an execution time storage unit which stores execution times of the respective blocks in the NC programs; an execution time integration unit which reads out the execution times of the pre-read blocks, from the execution time storage unit, and integrates the read out execution times; a determination unit which compares the integrated execution times of the pre-read blocks in the respective NC programs, and determines an NC program having the shortest integrated value of the execution times of the pre-read blocks; and a pre-reading execution unit which subsequently performs pre-reading of the NC program having the shortest integrated value of the execution times of the pre-read blocks, as determined by the determination unit.

The result of measuring the execution times of the blocks in each of the NC programs by previously carrying out processing in accordance with the NC program may be stored in the execution time storage unit, and the execution times stored in the execution time storage unit may be read out in next and subsequent processes.

A second aspect of the numerical controller according to the present invention is a numerical controller having a program pre-reading function for successively pre-reading blocks of a plurality of NC programs from a memory or from a storage device connected via a network, while executing the NC programs in parallel, the numerical controller comprising: an execution time calculation unit which calculates execution times from contents of commands of the respective blocks in the NC programs; an execution time integration unit which integrates the execution times of the pre-read blocks calculated by the execution time calculation unit; a determination unit which compares the integrated execution times of the pre-read blocks in the respective NC programs, and determines an NC program having the shortest integrated value of the execution times of the pre-read blocks; and a pre-reading execution unit which subsequently performs pre-reading of the NC program having the shortest integrated value of the execution times of the pre-read blocks, as determined by the determination unit.

The execution time calculation unit may include: a division unit which divides a tool path into segments which are small sections; a speed calculation unit which determines a speed in a tangential direction of the segment; a segment movement time calculation unit which calculates a time required for a tool to move along each segment, on the basis of the speed in the tangential direction as determined by the speed calculation unit; and a tool movement time calculation unit which determines, as a tool movement time, a sum of the times taken to move along each segment calculated by the segment movement time calculation unit, and the numerical controller may be configured so as to calculate a time required for the tool to move along a designated path in accordance with NC commands.

The numerical controller may further include: an integrated execution time monitoring unit which, in parallel with an operation based on the NC program, continuously monitors an integrated value of the execution times of the pre-read blocks of an NC program which is being executed;

a deceleration/temporary halt unit which decelerates or temporarily halts the operation based on the NC program, when the integrated execution time monitoring unit has determined that the integrated value of the execution times of the pre-read blocks has become equal to a time required to safely decelerate and halt the operation based on the NC program; a pre-reading unit which pre-reads the NC program from the memory or from the storage device connected via the network, during deceleration or temporarily halting of the operation based on the NC program; and an operation restarting unit which restarts the operation based on the NC program, when the integrated value of the execution times of the pre-read blocks sufficiently guarantees the time required to safely decelerate and halt the operation based on the NC program, during deceleration or temporary halting of the operation based on the NC program, and the blocks of the plurality of NC programs may be pre-read successively from the memory or from the storage device connected via the network.

The execution time storage unit may have a program pre-reading function in which, when the machining is carried out previously and the execution time for the processing is measured and stored, and if a decrease in a feed rate occurs due to the integrated value of the execution times of the pre-read blocks having become equal to a time required for deceleration and halting, then the execution time in a case where no decrease in the feed rate has occurred is stored rather than storing the execution time directly.

A third aspect of the numerical controller according to the present invention is a numerical controller which sets a time, a position of an axis, or a position of a spindle, as a reference, and stores table format data in which the reference time, the reference axis position or the reference spindle position is associated with a position of an axis or a spindle, other than the reference axis or the reference spindle, in a memory or a storage device connected via a network, successively pre-reads the reference time, the reference axis position or the reference spindle position, and the position of the axis or the spindle other than the reference axis or the reference spindle, and controls the position of the other axis or spindle in synchronization with the reference time, the reference axis position or the reference spindle position. The numerical controller includes: an execution time integration unit which integrates execution times of the pre-read blocks; a determination unit which compares the integrated execution times of the pre-read blocks in respective table format data items, and determines table format data having the shortest integrated value of the execution times of the pre-read blocks; and a pre-reading execution unit which subsequently performs pre-reading of the table format data having the shortest integrated value of the execution times of the pre-read blocks, as determined by the determination unit.

The execution time integration unit can include an integrated execution time prediction unit which predicts an integrated value of the execution times of the pre-read blocks from a difference between a current reference time and a reference time of the pre-read blocks.

The numerical controller may further include: an integrated execution time monitoring unit which, in parallel with an operation based on the table format data, continuously monitors an integrated value of the execution times of the pre-read blocks of table format data which is being executed; a deceleration/temporary halt unit which decelerates or temporarily halts the operation based on the table format data, when the integrated execution time monitoring unit has determined that the integrated value of the execution times of the pre-read blocks has become equal to a time required to safely decelerate and halt the operation based on the table format data; a pre-reading unit which pre-reads the table format data from the memory or from the storage device connected via the network, during deceleration or temporarily halting of the operation based on the table format data; and an operation restarting unit which restarts the operation based on the table format data, when the integrated value of the execution times of the pre-read blocks sufficiently guarantees the time required to safely decelerate and halt the operation based on the table format data, during deceleration or temporary halting of the operation based on the table format data, and the blocks of the table format data may be pre-read successively from the memory or from the storage device connected via the network.

According to the present invention, it is possible to provide a numerical controller provided with a program pre-reading function for preventing the pre-reading from failing to be performed in time, and preventing lengthening of the cycle time, when a plurality of NC programs are executed in parallel, and furthermore, it is also possible to provide a numerical controller provided with an operating function based on table format data, wherein, when a plurality of table format data are executed in parallel during operation of the table format data (path table operation), the generation of an alarm or an immediate axes stop due to the fact that pre-reading is not performed in time, becomes less liable to occur. As a result of this, it becomes unnecessary to modify table format data as in the prior art, and shortening of the cycle time can be expected compared to the prior art.

BRIEF DESCRIPTION OF THE DRAWINGS

The abovementioned and further objects and characteristic features of the present invention will become evident from the following description of the embodiments with reference to the drawings, in which:

FIG. 5 is an example of path tables for an X axis, a spindle S and an auxiliary function, which are executed in the path table operation shown in FIG. 4;

FIG. 11 is a principal block diagram of a numerical controller according to the present invention which executes an NC program or path table operation;

FIG. 12 is a diagram showing three program examples which are executed mutually in parallel by pre-reading in NC program operation;

DETAILED DESCRIPTION OF THE PREFERRED EMBODIMENTS

Figure 1:
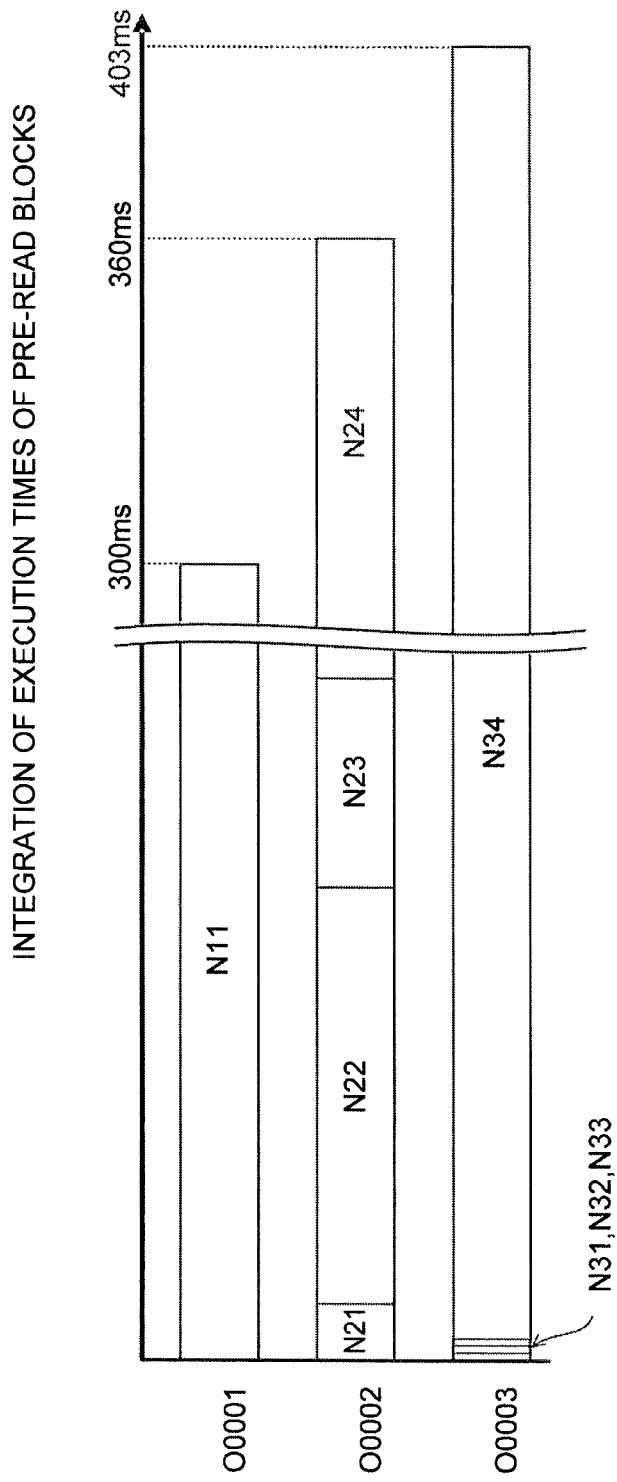
FIG. 1 is a diagram showing the integrated value (the integrated execution time) of the execution times of the pre-read blocks in each of the three programs shown in FIG. 12, at a stage where nine blocks have been pre-read by a numerical controller according to the present invention.

Below, an embodiment of the present invention is described with reference to the drawings, in respect of (I) a case where a plurality of NC programs are executed, and (II) a case where operation (path table operation) is executed on the basis of the table format data.

(I) Executing a Plurality of NC Programs

In the present invention, pre-reading is performed by prioritizing programs having a short integrated value of the execution times of the pre-read blocks. When the three NC programs shown in FIG. 12 are operated, pre-reading is performed according to the sequence indicated below. The values inside the [ ] below indicate the program names, and the integrated values (integrated execution times) of the execution times of the blocks corresponding to the respective programs. Furthermore, the underlining indicates the program having the shortest integrated value of the execution times of the pre-read program blocks. The method for determining the execution times of the blocks in order to integrate the execution times of the pre-read blocks is described below.

(1) N11 is pre-read and then the execution times of the pre-read blocks in each of the programs are integrated.

[Integrated value of execution times of pre-read blocks (O0001, O0002, O0003)=(300, 0, 0)]

(2) Since O0002 has the shortest integrated value of the execution times of the pre-read blocks in (1) above, then N21 is pre-read and subsequently, the execution times of the pre-read blocks of each of the programs are integrated.

[Integrated value of execution times of pre-read blocks (O0001, O0002, O0003)=(300, 10, 0)]

(3) Since O0003 has the shortest integrated value of the execution times of the pre-read blocks in (2) above, then N31 is pre-read and subsequently, the execution times of the pre-read blocks of each of the programs are integrated.

[Integrated value of execution times of pre-read blocks (O0001, O0002, O0003)=(300, 10, 1)]

(4) Since O0003 has the shortest integrated value of the execution times of the pre-read blocks in (3) above, then N32 is pre-read and subsequently, the execution times of the pre-read blocks of each of the programs are integrated.

[Integrated value of execution times of pre-read blocks (O0001, O0002, O0003)=(300, 10, 2)]

(5) Since O0003 has the shortest integrated value of the execution times of the pre-read blocks in (4) above, then N33 is pre-read and subsequently, the execution times of the pre-read blocks of each of the programs are integrated.

[Integrated value of execution times of pre-read blocks (O0001, O0002, O0003)=(300, 10, 3)]

(6) Since O0003 has the shortest integrated value of the execution times of the pre-read blocks in (5) above, then N34 is pre-read and subsequently, the execution times of the pre-read blocks of each of the programs are integrated.

[Integrated value of execution times of pre-read blocks (O0001, O0002, O0003)=(300, 10, 403)]

(7) Since O0002 has the shortest integrated value of the execution times of the pre-read blocks in (6) above, then N22 is pre-read and subsequently, the execution times of the pre-read blocks of each of the programs are integrated.

[Integrated value of execution times of pre-read blocks (O0001, O0002, O0003)=(300, 110, 403)]

(8) Since O0002 has the shortest integrated value of the execution times of the pre-read blocks in (7) above, then N23 is pre-read and subsequently, the execution times of the pre-read blocks of each of the programs are integrated.

[Integrated value of execution times of pre-read blocks (O0001, O0002, O0003)=(300, 160, 403)]

(9) Since O0002 has the shortest integrated value of the execution times of the pre-read blocks in (8) above, then N24 is pre-read and subsequently, the execution times of the pre-read blocks of each of the programs are integrated.

[Integrated value of execution times of pre-read blocks (O0001, O0002, O0003)=(300, 360, 403)]

FIG. 1 is a diagram showing the integrated value (the integrated execution time) of the execution times of the pre-read blocks in each of the three programs shown in FIG. 12, at a stage where nine blocks have been pre-read by the numerical controller according to the present invention. As shown in FIG. 1, at the stage where the same number of blocks as in the prior art case (nine blocks in total) have been pre-read, the integrated value of the execution times of the pre-read blocks in each program is shortest, 300 ms, in the case of O0001. Since pre-reading is performed in parallel during the operation of pre-read blocks, a wait does not occur due to the pre-reading not being performed in time.

Figure 2:
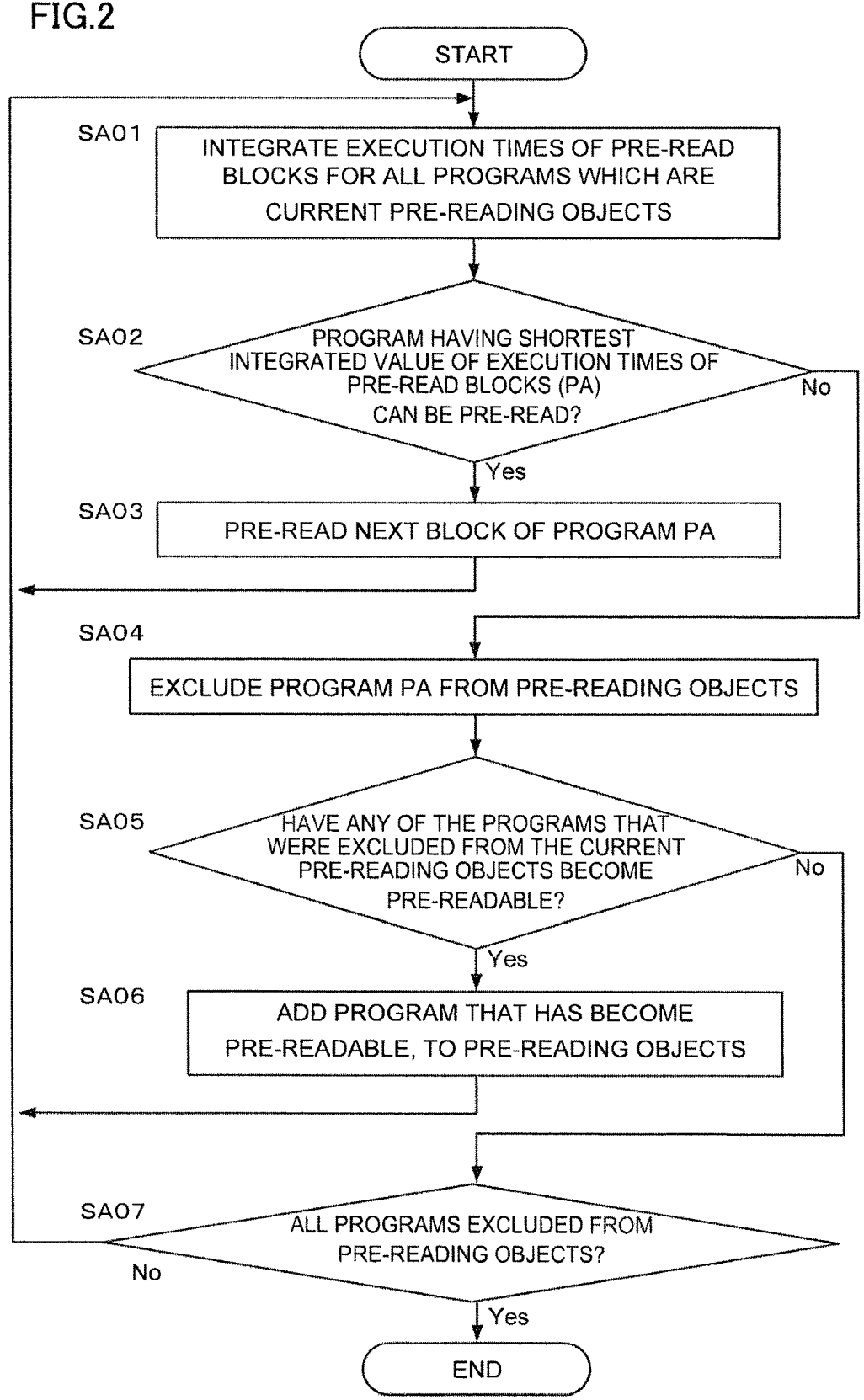
FIG. 2 is a diagram illustrating a flow of a pre-reading process when a plurality of NC programs are executed in parallel by the numerical controller according to the present invention.

FIG. 2 is a diagram illustrating a flow of a pre-reading process when a plurality of NC programs are executed in parallel. This is described below on the basis of the respective steps.

[Step SA01] The execution time of the pre-read blocks is integrated in respect of all of the programs which are targets to be pre-read. This step constitutes an execution time integration unit of the numerical controller.

[Step SA02] It is determined whether or not it is possible to pre-read the program PA having the shortest integrated value of the execution times of the pre-read blocks, and if the program can be pre-read (YES), then the procedure proceeds to step SA03, whereas if the program cannot be pre-read (NO), then the procedure proceeds to step SA04. This step constitutes an execution time determination unit of the numerical controller.

[Step SA03] The next block of the program PA is pre-read and the procedure returns to step SA01. This step constitutes a pre-reading unit of the numerical controller.

[Step SA04] Because it was determined in step SA02 that the program PA cannot be pre-read, then program PA is excluded from the pre-reading objects.

[Step SA05] It is determined whether or not any of the programs which have been excluded from the current pre-reading objects has become pre-readable object, and if one of these programs has become a pre-readable object (YES), then the procedure proceeds to step SA06, whereas if none of these programs has become pre-readable (NO), then the procedure proceeds to step SA07.

[Step SA06] The program which could be pre-read is added to the pre-reading objects, and the procedure returns to step SA01.

[Step SA07] It is determined whether or not all of the program have been excluded from the pre-reading objects, and if all of the programs have been excluded from the pre-reading objects (YES), then this process is terminated, whereas if all of the programs have not been excluded from the pre-reading objects (NO), then the procedure returns to step SA01.

The following reasons can be envisaged as examples in which a program is excluded from the pre-reading objects in the flowchart shown in FIG. 2: a program termination, reset, stop by alarm, or pre-read prohibition command.

Here, the method for determining the execution times of the blocks in order to integrate the execution times of the pre-read blocks is described below.

Firstly, in first means for determining the execution times of pre-read blocks, machining is performed in advance by using the machine tool, the execution times of each block when the machining is performed is measured, and the execution times thus measured are stored in a storage device of the controller of the machine tool. In the next and subsequent process by the machine tool, the execution times stored in the storage device are read out to give the execution times of the pre-read blocks.

Next, in second means for determining the execution times of pre-read blocks, the execution times are calculated from the details of the commands in each block of the NC program. This second means (execution time calculation unit) is means for calculating the time required to move the tool along the designated path by an NC command, and is constituted by: means for dividing the tool path into segments, which are small sections; a speed calculation unit which determines a speed in the tangential direction of the segments; a segment movement time calculation unit which calculates the time required to move the tool in each segment, on the basis of the speed in the tangential direction determined by the speed calculation unit; and a tool movement time calculation unit which determines the total time for moving in each segment calculated by the segment movement time calculation unit (in other words, the block execution time). The second means is well-known technology which has been disclosed in Japanese Patent Application Laid-Open No. 2012-93975, and is not described further here.

Figure 8:
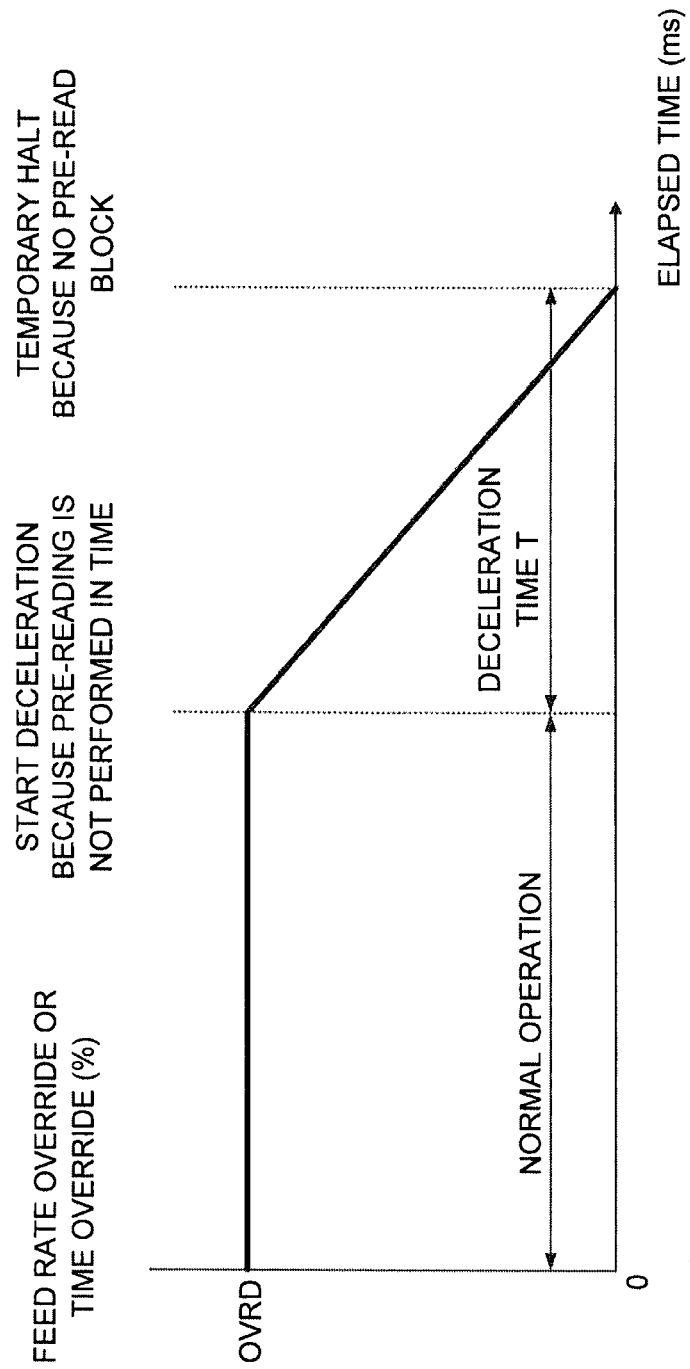
FIG. 8 is a diagram illustrating deceleration of the operation by reducing the feed rate override in the case of NC program operation or reducing the time override in the case of path table operation, if pre-reading of an NC program or path table operation is not performed in time, and temporary halting by setting the feed rate override or the time override to zero, if there are not any pre-read blocks at all.

Here, a supplementary explanation is given with reference to FIG. 8 with regard to monitoring, operational deceleration and temporary halting, in a case where the pre-reading of the NC program operation is not performed in time.

FIG. 8 is a diagram illustrating a case where operation is decelerated by reducing the feed rate override when the pre-reading of the NC program operation is not performed in time, and if there are not any pre-read blocks at all, then the feed rate override is set to zero and the tool is temporarily halted.

When operating while pre-reading a NC program, the pre-read blocks which enable deceleration or halting of the NC program operation are guaranteed, at minimum, with reference to the ratio of the actual rate relative to the current command rate for the feed axis (the feed rate override).

If the pre-reading is not performed in time at the current feed rate override, then the operation is decelerated by reducing the feed rate override, and if there are not any pre-read blocks at all, then the feed rate override is set to zero and the tool is temporarily halted. If pre-reading of a NC program is performed during this deceleration or halting, and the situation of the pre-reading not being performed in time ceases to exist, then an acceleration is applied by increasing the feed rate override.

A method for determining that pre-reading has failed to be performed is now described, taking the current feed rate override to be OVRD, and taking the time for safe deceleration and halting with a linear deceleration to be T (ms).

The integrated value (the integrated execution time) X of the execution times of the pre-read blocks in the period T (ms) from the start of deceleration until a temporary halt is consumed by (OVRD/100)×T/2, and therefore, if it is determined that pre-reading has failed to be performed in time when a situation occurs in which $$X=(OVRD/100)\times T/2,$$

then the deceleration and halting can be performed in the deceleration time T (ms).

The foregoing supposes that deceleration is linear, but it is also possible to determine that pre-reading has failed to be performed in time, in a similar fashion, in the case of bell-shaped deceleration or other situations.

Figure 9:
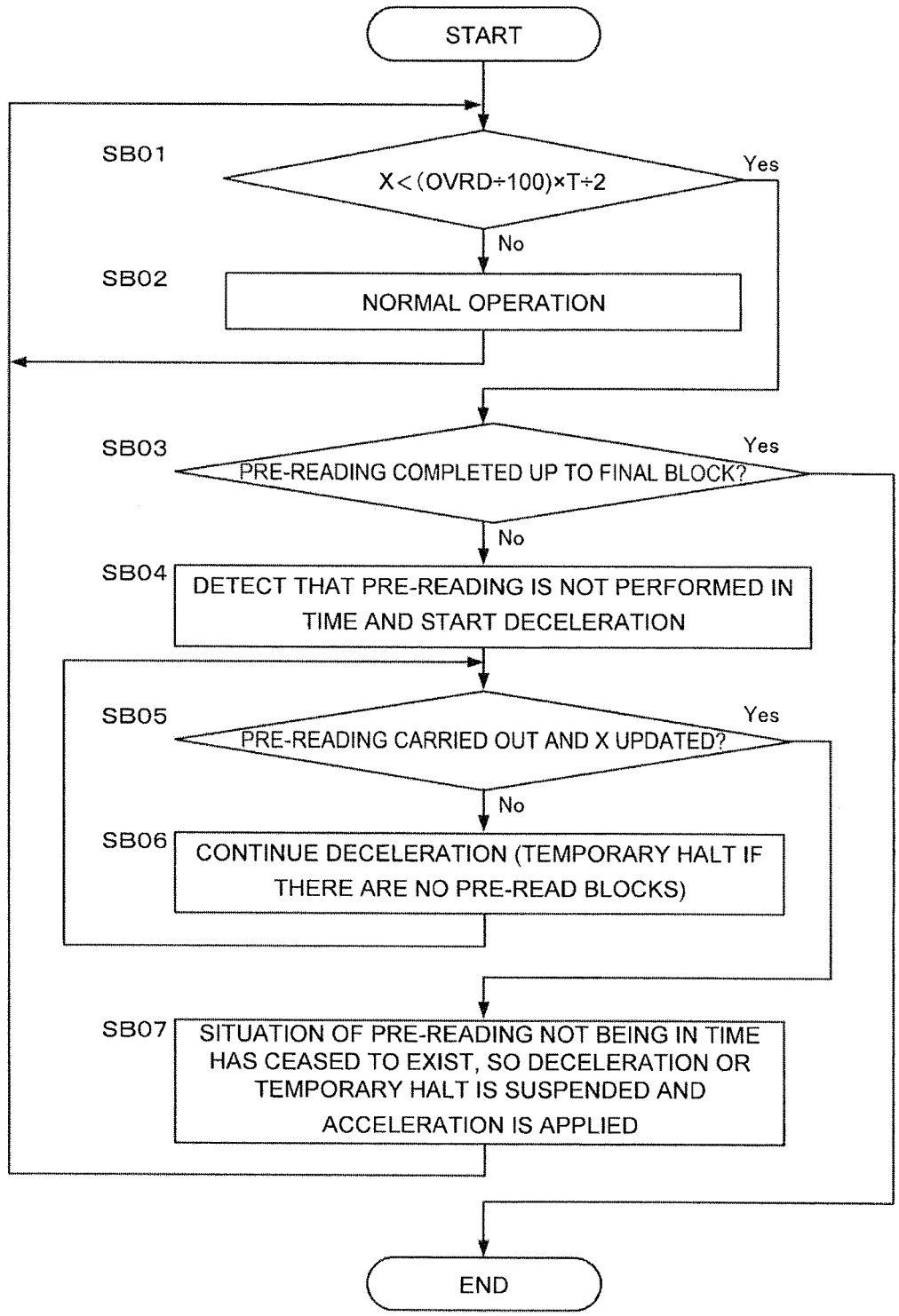
FIG. 9 is a flowchart illustrating processing of an NC program.

FIG. 9 is a flowchart illustrating processing of an NC program operation. The integrated value of the execution times of the pre-read blocks is taken to be X. The current feed rate override is taken to be OVRD (%) and the deceleration time is taken to be T (ms). This is described below on the basis of the respective steps.

[Step SB01] It is determined whether or not the integrated value X of the execution times of the pre-read blocks is smaller than the amount of time consumed by the pre-read blocks, (OVRD/100)×T/2, during the deceleration time T (from the start of deceleration until a temporary halt), and if the integrated value X is smaller (YES), then the procedure proceeds to step SB03, whereas if the integrated value X is not smaller (NO), then the procedure proceeds to step SB02.

[Step SB02] The NC program operation is continued as normal, and the procedure returns to step SB01.

[Step SB03] It is determined whether or not pre-reading has been completed up to the final block, and if pre-reading has been completed up to the final block (YES), then this process is terminated, whereas if pre-reading has not been completed up to the final block (NO), then the procedure proceeds to step SB04.

[Step SB04] It is determined that pre-reading will not be performed in time, and deceleration is started.

[Step SB05] It is determined whether pre-reading is performed and then the integrated value X of the execution times of the pre-read blocks has been updated or not, and if the integrated value X of the execution times of the pre-read blocks has been updated after performing pre-reading (YES), then the procedure proceeds to step SB07, whereas if the integrated value X of the execution times of the pre-read blocks has not been updated after performing pre-reading (NO), then the procedure proceeds to step SB06.

[Step SB06] Deceleration is continued (a temporary halt is performed if there are no pre-read blocks), and the procedure returns to step SB05.

[Step SB07] Since the situation of pre-reading not being performed in time has ceased to exist as a result of the routines performed in step SB05 and SB06, then the deceleration or temporary halt is suspended, acceleration is applied, and the procedure returns to step SB01.

Figure 16:
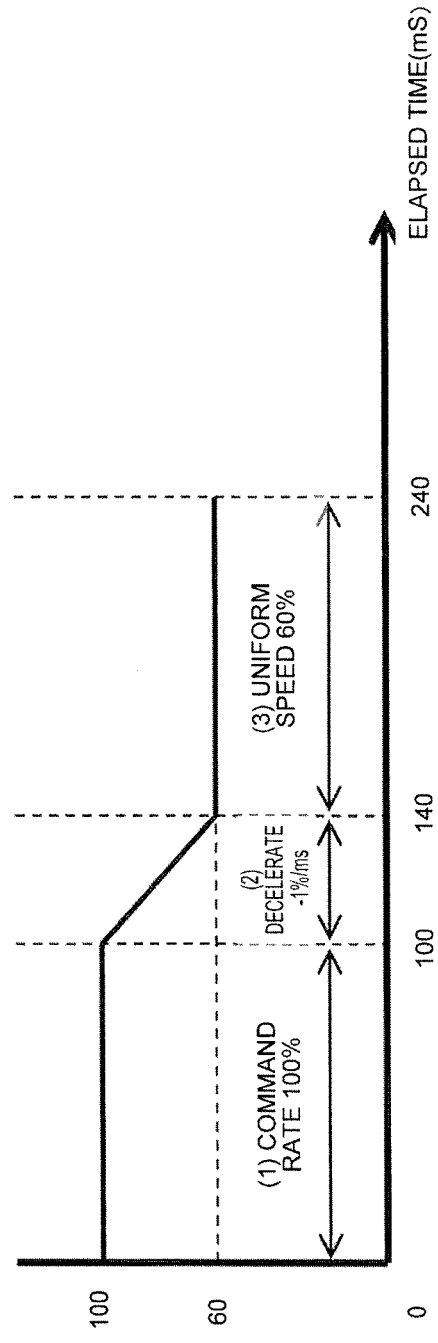
FIG. 16 is an example of the execution time for a particular block in a case where operation is decelerated, when the pre-reading is not performed in time in NC program operation.

FIG. 16 is a diagram illustrating a process for storing the execution time, assuming that the NC program operation is performed at the commanded feed rate (a state where the feed rate override is 100%), even if there is change in the execution time of a particular block, due to the deceleration or temporary halt described above with reference to FIG. 8 and FIG. 9.

During the initial 100 (ms), operation is executed at a feed rate override of 100% in accordance with the command rate, but thereafter, pre-reading is not performed in time, and hence the operation is decelerated by −1.0 (%/ms) and for the following 100 ms, the tool is operated at a feed rate override of 60%, and execution of the corresponding block is finished. In this case, the execution time where deceleration is not to be performed would be: 100×(100/100)=100 (ms) in section (1), (100/100+60/100)/2×40=32 (ms) in section (2), and 100×(60/100)=60 (ms) in section (3), making a total of 192 (ms).

Therefore, even if deceleration and a temporary halt is performed without the pre-reading being performed in time, it is still possible to store an accurate execution time by the "first means" described above.

(II) Executing Operation (Path Table Operation) Based on Table Format Data

In the table format data used in path table operation, a time or a position of an axis or spindle is used as a reference time or a reference axis or spindle position, and a position of an axis or spindle, other than the axis or spindle of which position serves as the reference axis or spindle position, is associated with the reference time or reference axis or spindle position.

In operation based on table format data, all of the axes operate in synchronization with the reference time, by designating, on the basis of the table format data, the timings at which the tool is to pass through each point of the program path. Similarly, all of the command for the spindle and auxiliary function commands are output in synchronization with the reference time, by designating, on the basis of the table format data, the timings at which the command for the spindle and auxiliary function commands are output.

Figure 3:
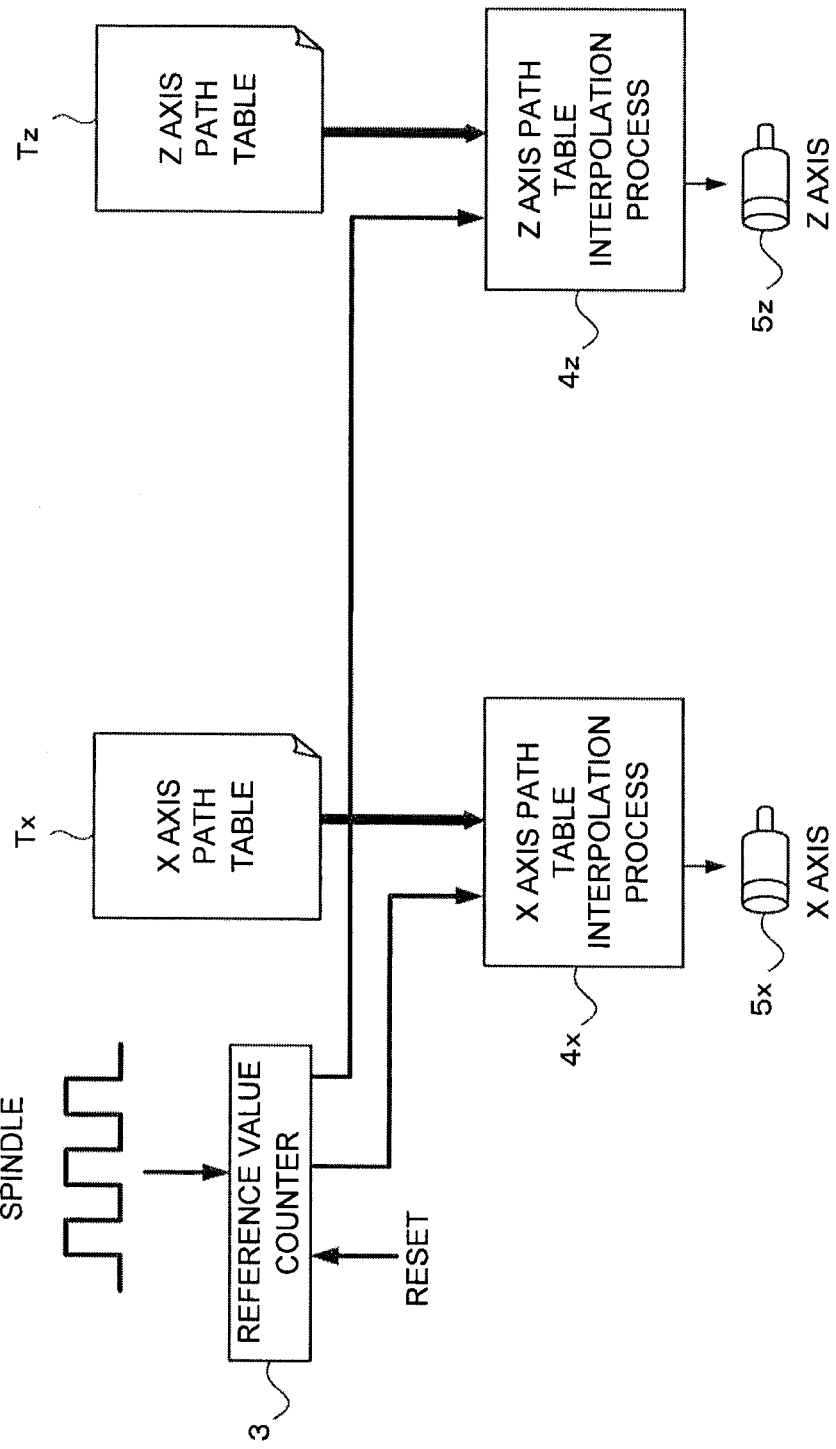
FIG. 3 is a block diagram illustrating path table operation.

FIG. 3 is a path table operation block diagram which is disclosed in Japanese Patent Application Laid-Open No. 2012-234445 described above.

A numerical controller which performs path table operation is provided with: a reference value counter 3, an X axis path table Tx, a Z axis path table Tz, an X axis path table interpolation processing unit 4x, a Z axis path table interpolation processing unit 4z, an X axis (feed axis) motor 5x, and a Z axis (feed axis) motor 5z.

The reference time may be shared with all of the table format data, or alternatively, it is possible to use individual reference times for each table format data. In the description given below, for the purposes of simplicity, it is assumed that a common reference time is used for all of the table format data.

Figure 4:
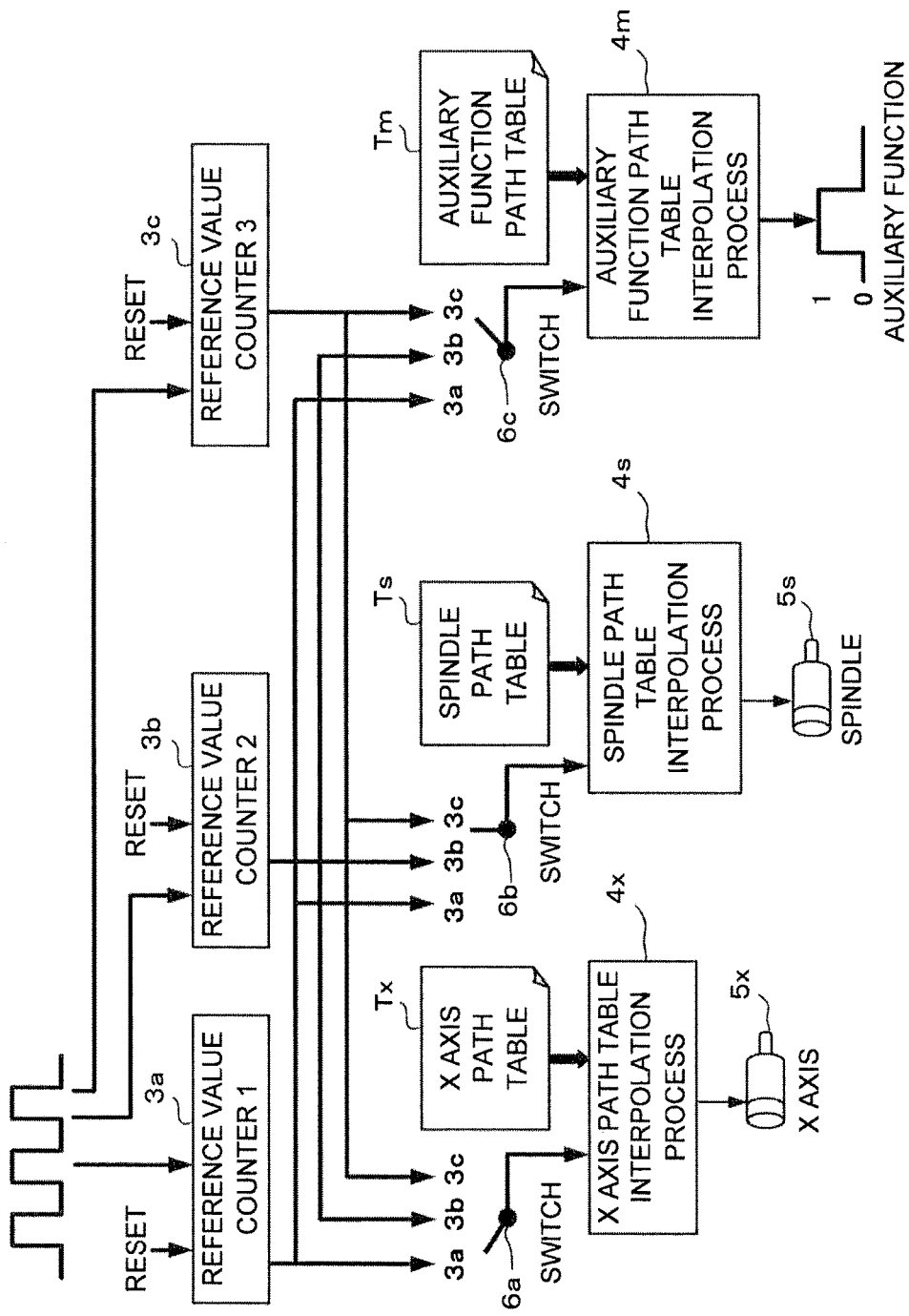
FIG. 4 is a block diagram illustrating path table operation.

Japanese Patent Application Laid-Open No. 2012-234445 described above also discloses the path table operation block diagram shown in FIG. 4.

The numerical controller which performs the path table operation shown in FIG. 4 is provided with: a first reference value counter 3a, a second reference value counter 3b and a third reference value counter 3c, which count, in respectively independent fashion, a time, the position of a spindle, or the position of a feed axis; an X axis path table Tx; a spindle path table Ts; an auxiliary function path table Tm; an X axis path table interpolation processing unit 4x; a spindle path table interpolation processing unit 4s; an auxiliary function path table output processing unit 4m; an X axis motor 5x; and a spindle motor 5s.

The first reference value counter 3a, the second reference value counter 3b and the third reference value counter 3c count a signal from a clock function of the numerical controller or a position detection signal from a position detector which is installed on the respective feed axes or the spindle. When the first reference value counter 3a, the second reference value counter 3b and the third reference value counter 3c respectively receive a counter reset signal, the count value is returned to an initial value, when a halt signal is received thereby, the updating of the count value is stopped, and when a restart signal is received, the updating of the count value is restarted.

The reference values from the first reference value counter 3a, the second reference value counter 3b and the third reference value counter 3c are switched as desired, by switches 6a, 6b and 6c. For example, the path table operation can be executed by executing the X axis path table Tx in accordance with the reference value from the first reference value counter 3a, executing the spindle path table Ts in accordance with the reference value from the second reference value counter 3b, and executing the auxiliary function path table Tm in accordance with the reference value from the third reference value counter 3c. Alternatively, path table operation can also be executed by executing all of the path tables Tx, Ts, Tm in accordance with the reference value from the reference value counter 3a, depending on the settings of the switches 6a, 6b and 6c.

Examples are given here of an X axis path table, a spindle S path table and an auxiliary function path table shown in FIG. 5, which are executed by the numerical controller shown in FIG. 4. When the path tables shown in FIG. 5 are executed by the numerical controller in FIG. 4, then the machine tool performing a path table operation carries out the operations shown in FIG. 6, as the reference time progresses.

Figures 13, 14:
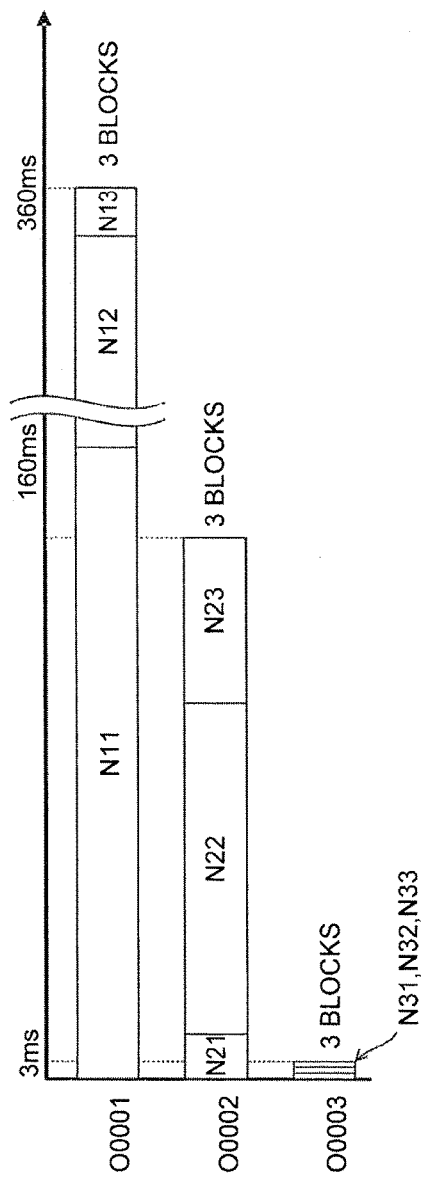
FIG. 13 is a diagram showing the integrated value (the integrated execution time) of the execution times of the pre-read blocks in each of the three programs shown in FIG. 12, at a stage where nine blocks have been pre-read, in accordance with the prior art.
FIG. 14 shows examples of three path tables (X-axis path table <X>, spindle S path table <S> and auxiliary function path table <M>)
Figure 15:
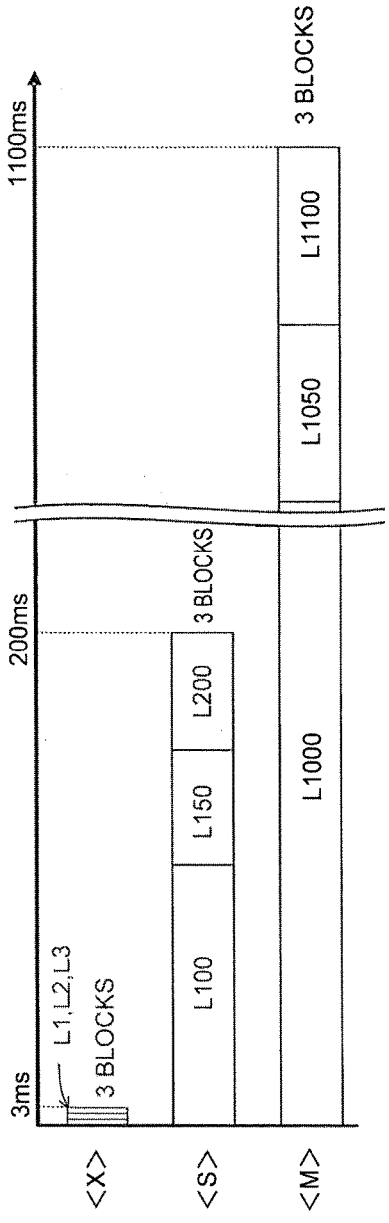
FIG. 15 is a diagram showing the integrated value (integrated execution time) of the execution times of the pre-read blocks in each of the three path tables shown in FIG. 14, at a stage where nine blocks have been pre-read, in accordance with the prior art.

In the present invention, pre-reading is performed by prioritizing the pre-reading of the path table having a short integrated value of the execution times of the pre-read blocks. If the path tables shown in FIG. 14 are operated, pre-reading is performed in the following sequence. The values inside the [ ] below indicate the path table names, and the integrated values (integrated execution times) of the execution times of the blocks corresponding to the respective path tables. Furthermore, the underlining indicates the path table having the shortest integrated value of the execution times of the pre-read program blocks. The execution times of the blocks for integrating the execution times of the pre-read blocks are described below.

(1) L1 in <X> is pre-read and then the execution times of the pre-read blocks in each of the programs are calculated.
[Integrated value of execution times of pre-read blocks (<X>, <S>, <M>)=(1, 0, 0)]

(2) Since <S> has the shortest integrated value of the execution times of the pre-read blocks in (1) above, then L100 in <S> is pre-read and subsequently, the execution times of the pre-read blocks of each of the programs are calculated.

[Integrated value of execution times of pre-read blocks (<X>, <S>, <M>)=(1, 100, 0)]

(3) Since <M> has the shortest integrated value of the execution times of the pre-read blocks in (2) above, then L1000 in <M> is pre-read and subsequently, the execution times of the pre-read blocks of each of the programs are calculated.

[Integrated value of execution times of pre-read blocks (<X>, <S>, <M>)=(1, 100, 1000)]

(4) Since <X> has the shortest integrated value of the execution times of the pre-read blocks in (3) above, then L2 in <X> is pre-read and subsequently, the execution times of the pre-read blocks of each of the programs are calculated.

[Integrated value of execution times of pre-read blocks (<X>, <S>, <M>)=(2, 100, 1000)]

(5) Since <X> has the shortest integrated value of the execution times of the pre-read blocks in (4) above, then L3 in <X> is pre-read and subsequently, the execution times of the pre-read blocks of each of the programs are calculated.

[Integrated value of execution times of pre-read blocks (<X>, <S>, <M>)=(3, 100, 1000)]

(6) Since <X> has the shortest integrated value of the execution times of the pre-read blocks in (5) above, then L300 in <X> is pre-read and subsequently, the execution times of the pre-read blocks of each of the programs are calculated.

[Integrated value of execution times of pre-read blocks (<X>, <S>, <M>)=(300, 100, 1000)]

(7) Since <S> has the shortest integrated value of the execution times of the pre-read blocks in (6) above, then L150 in <S> is pre-read and subsequently, the execution times of the pre-read blocks of each of the programs are calculated.

[Integrated value of execution times of pre-read blocks (<X>, <S>, <M>)=(300, 150, 1000)]

(8) Since <S> has the shortest integrated value of the execution times of the pre-read blocks in (7) above, then L200 in <S> is pre-read and subsequently, the execution times of the pre-read blocks of each of the programs are calculated.

[Integrated value of execution times of pre-read blocks (<X>, <S>, <M>)=(300, 200, 1000)]

(9) Since <S> has the shortest integrated value of the execution times of the pre-read blocks in (8) above, then L300 in <S> is pre-read and subsequently, the execution times of the pre-read blocks of each of the programs are calculated.

[Integrated value of execution times of pre-read blocks (<X>, <S>, <M>)=(300, 300, 1000)]

Figures 6, 7:
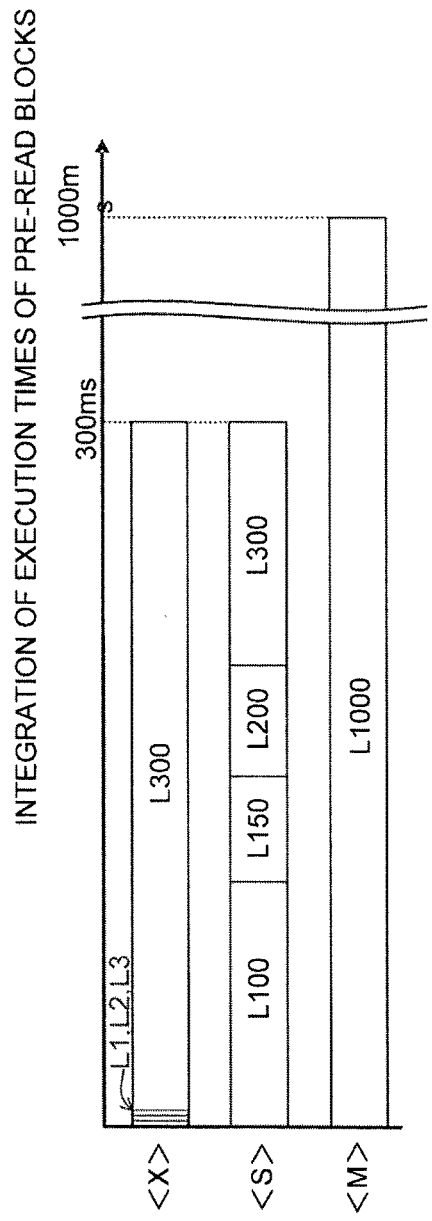
FIG. 6 is a diagram illustrating an operation executed in accordance with the advance of the reference time, when executing the path tables in FIG. 5.
FIG. 7 is a diagram showing the integrated value of the execution times of the pre-read blocks in each of the three path tables shown in FIG. 14, at a stage where nine blocks have been pre-read by a numerical controller according to the present invention.

FIG. 7 is a diagram showing the integrated value of the execution times of the pre-read blocks in each of the three path tables shown in FIG. 14, at a stage where nine blocks have been pre-read, in accordance with the present invention.

As shown in FIG. 7, at the stage where the same number of blocks as in the prior art case (nine blocks in total) have been pre-read, the integrated value of the execution times of the pre-read blocks is shortest, 300 ms, in the case of <X> and <S>. Since pre-reading is performed in parallel during the operation of pre-read blocks, there is a low probability of the pre-reading not being performed in time. Even if the pre-reading is not performed in time, since the operation of the path table involves a wait for pre-reading, then an alarm or immediate axes stop is not caused, as with the prior art technology.

Here, a supplementary explanation is given with reference to FIG. 8 with regard to monitoring, operational deceleration and temporary halting, in a case where the pre-reading of the path table operation is not performed in time. FIG. 8 is a diagram illustrating a case where operation is decelerated by reducing the time override when the pre-reading of the path table operation is not performed in time, and if there are not any pre-read blocks at all, then the time override is set to zero to perform a temporary halt.

When operating while pre-reading path tables, the pre-read blocks which enable deceleration and halting of the path table operation are guaranteed, at minimum, with reference to the rate of advance of the current reference time (time override).

If the pre-reading is not performed in time at the current time override, then the operation is decelerated by reducing the time override, and if there are not any pre-read blocks at all, then the time override is set to zero and the tool is temporarily halted. If pre-reading of the path table is performed during deceleration or halting, and the situation of the pre-reading not being performed in time has ceased to exist, then an acceleration is applied by increasing the time override.

A method for calculating the reference time in order to determine that pre-reading has failed to be performed in time is now described, taking the current time override to be OVRD, and taking the time for decelerating and halting safely with a linear deceleration to be T (ms).

The integrated value (the integrated execution time) X of the execution times of the pre-read blocks in the period T (ms) from the start of deceleration until a temporary halt is consumed by (OVRD/100)×T/2, and therefore, if it is determined that the pre-reading has failed to be performed in time when a situation occurs in which $$X=(OVRD/100)\times T/2,$$

then deceleration and halting can be performed in the deceleration time T (ms).

The foregoing supposes that deceleration is linear, but it is also possible to calculate the reference time in order to determine that pre-reading has failed to be performed in time, in a similar fashion, in the case of bell-shaped deceleration or other situations.

Figure 10:
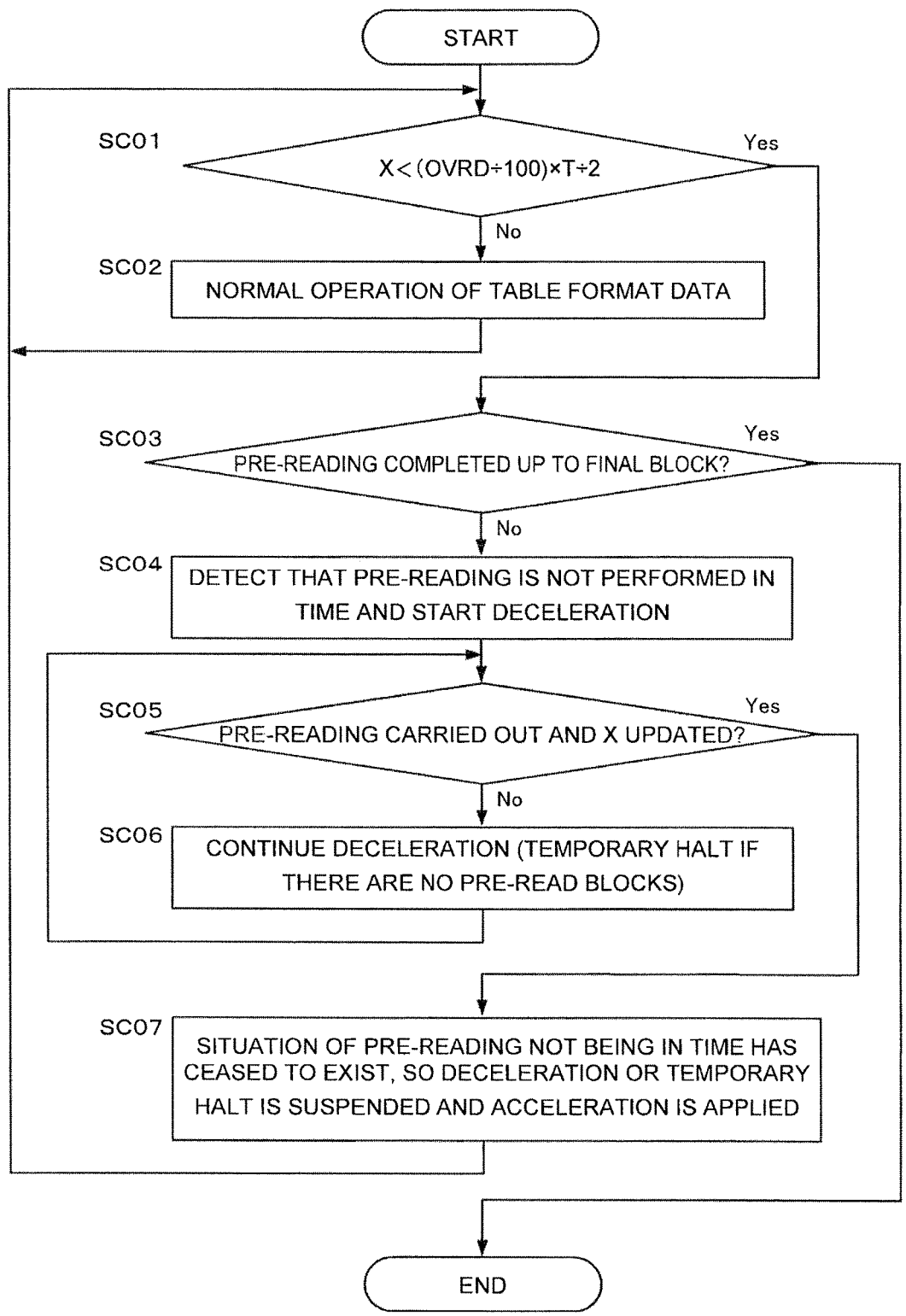
FIG. 10 is a flowchart illustrating processing of a path table operation.

FIG. 10 is a flowchart illustrating processing in a path table operation. The integrated value of the execution times of the pre-read blocks is taken to be X. The current time override is taken to be OVRD (%) and the deceleration time is taken to be T (ms). This is described below on the basis of the respective steps.

[Step SC01] It is determined whether or not the integrated value X of the execution times of the pre-read blocks is smaller than the amount of time consumed by the pre-read blocks, (OVRD/100)×T/2, during the deceleration time T (from the start of deceleration until the temporary halt), and if the integrated value X is smaller (YES), then the procedure proceeds to step SC 03, whereas if the integrated value X is not smaller (NO), then the procedure proceeds to step SC02.

[Step SC02] The table format data operation is continued as normal, and the procedure returns to step SC01.

[Step SC03] It is determined whether or not pre-reading has been completed up to the final block, and if pre-reading has been completed up to the final block (YES), then this process is terminated, whereas if pre-reading has not been completed up to the final block (NO), then the procedure proceeds to step SC04.

[Step SC04] It is determined that pre-reading is not being be performed in time, and deceleration is started.

[Step SC05] Pre-reading is performed, it is determined whether or not the integrated value X of the execution times of the pre-read blocks has been updated, and if the integrated value X of the execution times of the pre-read blocks has been updated (YES), then the procedure proceeds to step SC07, whereas if the integrated value X of the execution times of the pre-read blocks has not been updated (NO), then the procedure proceeds to step SC06.

[Step SC06] Deceleration is continued (a temporary halt is performed if there are no pre-read blocks), and the procedure returns to step SC05.

[Step SC07] Because the situation of the pre-reading not being performed in time has ceased to exist due to the processes in step SC05 and SCO6, then the deceleration or temporary halt is suspended, acceleration is applied, and the procedure returns to step SC01.

The execution times of the blocks which are used for integrating the execution times of the pre-read blocks are described below. The execution time integration unit which integrates the execution times of the pre-read blocks is means for predicting the integrated value of the execution times of the pre-read blocks, from the difference between the current reference time and the reference times of the pre-read blocks.

FIG. 11 is a principal block diagram of a numerical controller according to the present invention which executes an NC program or path table operation. The CPU 11 is a processor which implements overall control of the numerical controller 10. The CPU 11 reads out a system program stored in a ROM 12, via the bus 20, and controls the whole of the numerical controller 10 in accordance with this system program. Temporary calculation data, display data and various data input by the operator via the display device or manual data input (MDI) unit 70 is stored in a RAM 13. The SRAM 14 is backed up by a battery (not illustrated), and is configured as a non-volatile memory in which the storage device is maintained, even if the power supply to the numerical controller 10 is turned off.

A machining program (NC program) which is read out via the interface 15 and a machining program input via the display device MDI unit 70, and the like, are stored in the SRAM 14. Moreover, the various table format data (path tables) described above are stored in advance. Furthermore, various system programs for creating a machining program and executing editing routines, are written in advance to the ROM 12. With regard to the storage location of the NC programs and path tables, in the present invention, the NC program and path table data may be stored in advance in an external storage device which is connected via a network, for example, rather than in a storage device inside the numerical controller, and the respective blocks of the NC programs and the data of the path tables may be read out successively via the network.

The interface 15 makes it possible to connect the numerical controller 10 and an external device such as an adapter (not illustrated). Furthermore, a machining program that has been edited in the numerical controller 10 can be stored in an external storage device, via an external device. The programmable machine controller (PMC) 16 implements control by outputting signals via the I/O unit 17 to the auxiliary equipment, such as the actuators, of the machine tool, in accordance with a sequence program which is installed in the numerical controller 10. Furthermore, the PMC 16 also receives signals from various switches, and the like, of the operating panel which is provided on the main body of the machine tool, carries out necessary signal processing on those signals, and transfers same to the CPU 11. The display device/MDI unit 70 is a manual data input device provided with a display monitor and a keyboard, etc., and the interface 18 receives data and commands from the display device and/or the keyboard of the MDI unit 70 and transfers same to the CPU 11. The interface 19 is connected to the operating panel 71 so as to receive various commands from the operating panel 71.

Axis control circuits 30, 31 of the feed axes receive movement commands for the respective feed axes from the CPU 0.1, and output the commands for the respective feed axes to servo amplifiers 40, 41. The servo amplifiers 40, 41 receive these commands and drive the servo motors 50x, 51z of the feed axes. The servo motors 50x, 51z of the feed axes have built-in position/speed detectors (not illustrated), and position and speed feedback signals from the position/speed detectors are fed back to the axis control circuits 30, 31 so as to perform feedback control of the position and speed. In FIG. 11, this position and speed feedback is not illustrated.

Furthermore, the spindle control circuit 60 receives a spindle rotation command and outputs a spindle speed signal to a spindle amplifier 61. The spindle amplifier 61 receives the spindle speed signal and causes the spindle motor (spindle motor) 62 to rotate at a designated speed of rotation. A position coder 63 feeds back a feedback pulse (reference pulse) and a single rotation signal, to the spindle control circuit 60, in synchronization with the rotation of the spindle motor (spindle motor) 62, and implements speed control. This feedback pulse (reference pulse) and the single rotation signal are read in by the CPU 11 via the spindle control circuit 60, and the feedback pulse (reference pulse) is counted up by a counter which is provided in the RAM 13 (a counter corresponding to the respective reference value counters shown in FIG. 3 and FIG. 4). The command pulses of the spindle may also be counted.

Furthermore, the counter provided in the RAM 13 may obtain a reference signal for path table operation by counting up the number of pulses of a time signal which is obtained from a clock function provided in the numerical controller 10, or by counting up the number of pulses obtained from a feedback signal from the feed axis or the number of feed axis command pulses.

What is claimed is:
1. A numerical controller which executes a plurality of numerical control ("NC") programs at a same time in parallel by successively pre-reading blocks of the plurality of NC programs from a memory or from a storage device connected via a network so that the generation of an alarm or an immediate axes stop due to the pre-reading failing to be performed in time becomes less liable to occur, the numerical controller comprising:
   non-transitory computer readable memory;
   one or more hardware processors coupled to the non-transitory memory and configured to read instructions from the non-transitory memory to cause the numerical controller to perform operations comprising:
   storing execution times of the respective blocks in the plurality of NC programs;
   reading out, when one block in an NC program among the plurality of NC programs is pre-read, the execution time of the pre-read block, and calculates a sum total of the execution time of the pre-read block and the execution times of other blocks in the NC program which have been pre-read;
extracting, from the plurality of NC programs, one NC program having the smallest sum total of the execution times calculated; and
subsequently performing pre-reading of one block of the NC program which is extracted and has the smallest sum total of the execution times among those of the plurality of NC programs.

2. The numerical controller according to claim 1, wherein a result of measuring the execution times of the blocks in each of the NC programs by previously carrying out processing in accordance with the NC program is stored, and the execution times stored are read out in next and subsequent processes.

3. The numerical controller according to claim 2, the operations further comprising:
continuously monitoring, in parallel with an operation based on the NC program, an integrated value of the execution times of the pre-read blocks of an NC program which is being executed;
decelerating or temporarily halting the operation based on the NC program, when it has been determined that the integrated value of the execution times of the pre-read blocks has become equal to a time required to safely decelerate and halt the operation based on the NC program;
pre-reading the NC program from the memory or from the storage device connected via the network, during deceleration or temporarily halting of the operation based on the NC program; and
restarting the operation based on the NC program, when the integrated value of the execution times of the pre-read blocks is greater than or equal to the time required to safely decelerate and halt the operation based on the NC program, during deceleration or temporary halting of the operation based on the NC program,
wherein the blocks of the plurality of NC programs are pre-read successively from the memory or from the storage device connected via the network.

4. The numerical controller according to claim 2, further comprising a program pre-reading function in which, when the machining is carried out previously and the execution time for the machining is measured and stored, and if a decrease in a feed rate occurs due to the integrated value of the execution times of the pre-read blocks having become equal to a time required for deceleration and halting, then the execution time in a case where no decrease in the feed rate has occurred is stored rather than storing the measured execution time directly.

5. The numerical controller according to claim 1, the operations further comprising:
continuously monitoring, in parallel with an operation based on the NC program, an integrated value of the execution times of the pre-read blocks of an NC program which is being executed;
decelerating or temporarily halting the operation based on the NC program, when it has been determined that the integrated value of the execution times of the pre-read blocks has become equal to a time required to safely decelerate and halt the operation based on the NC program;
pre-reading the NC program from the memory or from the storage device connected via the network, during deceleration or temporarily halting of the operation based on the NC program; and
restarting the operation based on the NC program, when the integrated value of the execution times of the pre-read blocks is greater than or equal to the time required to safely decelerate and halt the operation based on the NC program, during deceleration or temporary halting of the operation based on the NC program,
wherein the blocks of the plurality of NC programs are pre-read successively from the memory or from the storage device connected via the network.

6. The numerical controller according to claim 1, further comprising a program pre-reading function in which, when the machining is carried out previously and the execution time for the machining is measured and stored, and if a decrease in a feed rate occurs due to the integrated value of the execution times of the pre-read blocks having become equal to a time required for deceleration and halting, then the execution time in a case where no decrease in the feed rate has occurred is stored rather than storing the measured execution time directly.

7. A numerical controller having a program pre-reading function which executes a plurality of numerical control ("NC") programs at a same time in parallel by successively pre-reading blocks of the plurality of NC programs from a memory or from a storage device connected via a network so that the generation of an alarm or an immediate axes stop due to the pre-reading failing to be performed in time becomes less liable to occur, the numerical controller comprising:
non-transitory computer readable memory;
one or more hardware processors coupled to the non-transitory memory and configured to read instructions from the non-transitory memory to cause the numerical controller to perform operations comprising:
calculating execution times from contents of commands of the respective blocks in the plurality of NC programs;
reading out, when one block in an NC program among the plurality of NC programs is pre-read, the execution time of the pre-read block calculated and calculates a sum total of the execution time of the pre-read block and the execution times of other blocks in the NC program which have been pre-read;
extracting, from the plurality of NC programs, one NC program having the smallest sum total of the execution times calculated; and
subsequently performing pre-reading of one block of the NC program which is extracted and has the smallest sum total of the execution times among those of the plurality of NC programs.

8. The numerical controller according to claim 7, wherein the operations further include:
dividing a tool path into segments which are small sections;
determining a speed in a tangential direction of the segment;
calculating a time required for a tool to move along each segment, on the basis of the speed in the tangential direction as determined; and
determining, as a tool movement time, a sum of the times taken to move along each segment calculated by the segment movement, and wherein the numerical controller is configured so as to calculate a time required for the tool to move along a designated path in accordance with NC commands.

9. The numerical controller according to claim 8, the operations further comprising:
continuously monitoring, in parallel with an operation based on the NC program, an integrated value of the execution times of the pre-read blocks of an NC program which is being executed;
decelerating or temporarily halting the operation based on the NC program, when it has been determined that the integrated value of the execution times of the pre-read blocks has become equal to a time required to safely decelerate and halt the operation based on the NC program;
pre-reading the NC program from the memory or from the storage device connected via the network, during deceleration or temporarily halting of the operation based on the NC program; and
restarting the operation based on the NC program, when the integrated value of the execution times of the pre-read blocks is greater than or equal to the time required to safely decelerate and halt the operation based on the NC program, during deceleration or temporary halting of the operation based on the NC program,
wherein the blocks of the plurality of NC programs are pre-read successively from the memory or from the storage device connected via the network.

10. The numerical controller according to claim 7, the operations further comprising:
continuously monitoring, in parallel with an operation based on the NC program, an integrated value of the execution times of the pre-read blocks of an NC program which is being executed;
decelerating or temporarily halting the operation based on the NC program, when it has been determined that the integrated value of the execution times of the pre-read blocks has become equal to a time required to safely decelerate and halt the operation based on the NC program;
pre-reading the NC program from the memory or from the storage device connected via the network, during deceleration or temporarily halting of the operation based on the NC program; and
restarting the operation based on the NC program, when the integrated value of the execution times of the pre-read blocks is greater than or equal to the time required to safely decelerate and halt the operation based on the NC program, during deceleration or temporary halting of the operation based on the NC program,
wherein the blocks of the plurality of NC programs are pre-read successively from the memory or from the storage device connected via the network.

11. The numerical controller according to claim 7, further comprising a program pre-reading function in which, when the machining is carried out previously and the execution time for the machining is measured and stored, and if a decrease in a feed rate occurs due to the integrated value of the execution times of the pre-read blocks having become equal to a time required for deceleration and halting, then the execution time in a case where no decrease in the feed rate has occurred is stored rather than storing the measured execution time directly.

12. A numerical controller which sets a time, a position of an axis, or a position of a spindle, as a reference, and which: stores a plurality of pieces of table format data in which the reference time, the reference axis position or the reference spindle position is associated with a position of an axis or a spindle, other than the reference axis or the reference spindle, in a memory or a storage device connected via a network; and executes the plurality of pieces of table format data in parallel at the same time by successively pre-reading a block of table format data composed of (i) the reference time, the reference axis position or the reference spindle position, and (ii) the position of the axis or the spindle other than the reference axis or the reference spindle, so that the generation of an alarm or an immediate axes stop due to the pre-reading failing to be performed in time becomes less liable to occur, the numerical controller comprising:
non-transitory computer readable memory;
one or more hardware processors coupled to the non-transitory memory and configured to read instructions from the non-transitory memory to cause the numerical controller to perform operations comprising:
storing execution times of the respective blocks in the plurality of pieces of table format data;
reading out, when one block in a piece of table format data among the plurality of pieces of table format data is pre-read, the execution time of the pre-read block, and calculating a sum total of the execution time of the pre-read block and execution times of other blocks in the pieces of table format data which have been pre-read;
extracting, from the plurality of pieces of table format data, one piece of table format data in which the sum total of the execution times calculated is the smallest; and
subsequently performing pre-reading of one block of the piece of table format data which is extracted and has the smallest sum total of the execution times among those of the plurality of table format data.

13. The numerical controller according to claim 12, wherein the operations further comprise storing an execution time of one block in one piece of table format data by predicting the execution time of the one block based on the difference between the reference time of the one block and the reference time of a block immediately before the one block.

14. The numerical controller according to claim 13, the operations further comprising:
continuously monitoring, in parallel with an operation based on the table format data, an integrated value of the execution times of the pre-read blocks of table format data which is being executed;
decelerating or temporarily halting the operation based on the table format data, when it has been determined that the integrated value of the execution times of the pre-read blocks has become equal to a time required to safely decelerate and halt the operation based on the table format data;
pre-reading the table format data from the memory or from the storage device connected via the network, during deceleration or temporarily halting of the operation based on the table format data; and
restarting the operation based on the table format data, when the integrated value of the execution times of the pre-read blocks is greater than or equal to the time required to safely decelerate and halt the operation based on the table format data, during deceleration or temporary halting of the operation based on the table format data, wherein the blocks of the table format data are pre-read successively from the memory or from the storage device connected via the network.

15. The numerical controller according to claim 12, the operations further comprising:
continuously monitoring, in parallel with an operation based on the table format data, an integrated value of the execution times of the pre-read blocks of table format data which is being executed;
decelerating or temporarily halting the operation based on the table format data, when it has been determined that the integrated value of the execution times of the pre-read blocks has become equal to a time required to safely decelerate and halt the operation based on the table format data;
pre-reading the table format data from the memory or from the storage device connected via the network, during deceleration or temporarily halting of the operation based on the table format data; and
restarting the operation based on the table format data, when the integrated value of the execution times of the pre-read blocks is greater than or equal to the time required to safely decelerate and halt the operation based on the table format data, during deceleration or temporary halting of the operation based on the table format data,
wherein the blocks of the table format data are pre-read successively from the memory or from the storage device connected via the network.

* * * * *